United States Patent [19]
Borzym

[11] 3,938,415
[45] Feb. 17, 1976

[54] TUBE CUTOFF APPARATUS

[76] Inventor: Alexander Borzym, 6841 Oakman, Dearborn, Mich. 48126

[22] Filed: Dec. 19, 1973

[21] Appl. No.: 426,087

[52] U.S. Cl. .................................... 83/385; 83/519
[51] Int. Cl.² ........................................... B26D 5/42
[58] Field of Search ............ 83/622, 385, 383, 375, 83/519

[56] References Cited
UNITED STATES PATENTS

| | | | |
|---|---|---|---|
| 2,205,389 | 6/1940 | Borzym | 83/622 |
| 2,250,931 | 7/1941 | Grieder | 83/385 X |
| 2,361,595 | 10/1944 | Broersma | 83/385 |
| 3,099,182 | 7/1963 | Alverson | 83/383 |
| 3,129,624 | 4/1964 | Auer | 83/622 X |

Primary Examiner—Willie G. Abercrombie
Assistant Examiner—W. R. Briggs
Attorney, Agent, or Firm—Thomas N. Young

[57] ABSTRACT

A double-cut tube cutoff machine for severing steel tubing in such a way as to produce minimum deformation of the tube in the severed area. The machine comprises a base carrying opposing die jaws to clamp the tube, and a ram assembly which moves vertically and reciprocally relative to the base. The ram carries a sharp-pointed severing blade which actually cuts the tubing. A first cam arrangement synchronizes the opening and closing of the die jaws to clamp the tube during a transverse slotting operation as well as during the final severing step. A second cam arrangement synchronizes the motion of a cross slide to ram movement to drive a slotting blade transversely across the tube to notch or slot the top wall part way through prior to the severing operation. The slotting blade is carried in a blade holder which receives inserts of varying thickness so slotting blades of conversely varying thickness all pass over the workpiece in the plane of the severing blade.

9 Claims, 14 Drawing Figures

TUBE CUTOFF APPARATUS

INTRODUCTION

This invention relates to machines for severing steel tubing and the like, and more particularly to such a machine as will perform a tube cutoff operation with minimum resulting deformation of the newly formed tube ends.

BACKGROUND OF THE INVENTION

My U.S. Pat. No. 3,273,433, granted Sept. 20, 1966, discloses a machine for severing steel tubing and the like wherein an objective is the minimization of denting and deforming the tube as a result of the severing operation. The machine disclosed in my patent comprises a set of complemental die jaws which may be closed to clamp and hold the workpiece, a pair of slotting blades which travel in parallel across the tubing to cut shallow notches in the top and bottom tube walls, and a severing blade which descends vertically through the die jaw set to cut the tubing at the slotted location. The slotting of the tube walls in the plane of the severing knife minimizes the tendency of the severing knife to deform the tube. Thus, although the apparatus for performing the slotting operation results in added cost and complexity in the tube cutoff machine, the slotting eliminates the need for treatment of the tube ends for shape restoration purposes.

BRIEF SUMMARY OF THE INVENTION

A principal objective of the present invention is to reduce the complexity and cost of the tube cutoff apparatus disclosed in my U.S. Pat. No. 3,273,433 while at the same time retaining the basic advantages of the double-cut operation; i.e., a cutoff operation which involves both slotting and severing by respective means. In general, this is accomplished in a cutoff machine having a pair of complemental die jaws for clamping and holding a tubular workpiece relative to a machine base, a single slotting knife together with means for effecting the programmed displacement of the knife transversely of the workpiece, and a severing knife which is caused to descend through the slotted area to cleanly sever the workpiece.

A more specific objective of the present invention is the provision of a novel and improved cam assembly for synchronizing the transverse displacement of the slotting knife and associated components with the vertical displacement of a ram assembly relative to the machine base. In a preferred embodiment hereinafter disclosed in greater detail, the cam assembly comprises a curved track-like guide member substantially vertically depending from the ram assembly and movable therewith and a slide-follower assembly operatively associated with the cam track and the slotting knife for causing the slotting knife holder to slide across the base as the ram assembly translates through a slotting zone in the reciprocal cycle of movement characteristic thereof.

A still further objective of the invention is the provision of a substantially improved programming cam assembly to control the opening and closing of the die jaws and to synchronize such operations with the reciprocal cyclical displacement of the cutoff machine ram assembly. As will be hereinafter made more apparent, the cycle of ram assembly displacement includes a neutral zone wherein the ram assembly occupies a central vertical position relative to the base, a slotting zone which is vertically above the neutral zone, and a severing zone which is vertically below the severing zone. Moreover, it is a requirement that the die jaws are open only during the travel of the ram assembly through the neutral zone in the up-bound direction, i.e., the jaws must remain closed on the tubing as the ram assembly passes downwardly from the slotting zone to the severing zone. In the preferred embodiment of the improved programming cam assembly hereinafter described, a lost motion cam action is provided through the combination of upper and lower elongated cam members which are respectively associated with the ram assembly and base, and a rigid shaft which extends in common aligment through the cam members to produce the lost motion operation during the vertical cycle of reciprocal motion of the ram assembly. The die jaws are carried by die jaw holders or slide assemblies, each of which is provided with a cam follower engaging one side of the cam assembly. Whenever the two elongated cam members are in axial abutment, the die jaw holder cam followers are forced apart to hold the die jaws together, clamping the workpiece. Whenever the elongated cam members separate from one another and, at the same time, the lower of the two cam members is in a predetermined position, the cam followers engage the reduced cross-section area of the shaft, thus, to permit the die jaws to open.

A still further feature of the invention is the provision of a novel blade location assembly to permit the use of slotting blades and severing blades of varying size and thickness while at the same time preserving the uniplanar arrangement thereof; it being clear that the slotting and severing blade must lie in the same plane during cutoff machine operation to enjoy the benefit of the double-cut technique. As applied to the slotting blade, the novel arrangement comprises a slotting blade holder having a seat portion for receiving a trapezoidal slotting blade and a set of spacers of varying thickness which may be disposed in the seat area between the blade and the holder to ensure that the blade lies at a predetermined planar position relative to the die jaws during machine operation. Accordingly, blades and spacers may be provided in sets and used in a correlated fashion to permit different blades for different workpiece sizes and materials.

Various other features and advantages of the invention will become apparent upon reading the following specification which, along with the patent drawings, describes and discloses a preferred but illustrative embodiment of the invention in great detail.

DETAILED DESCRIPTION OF THE SPECIFIC EMBODIMENT

Figure 1:
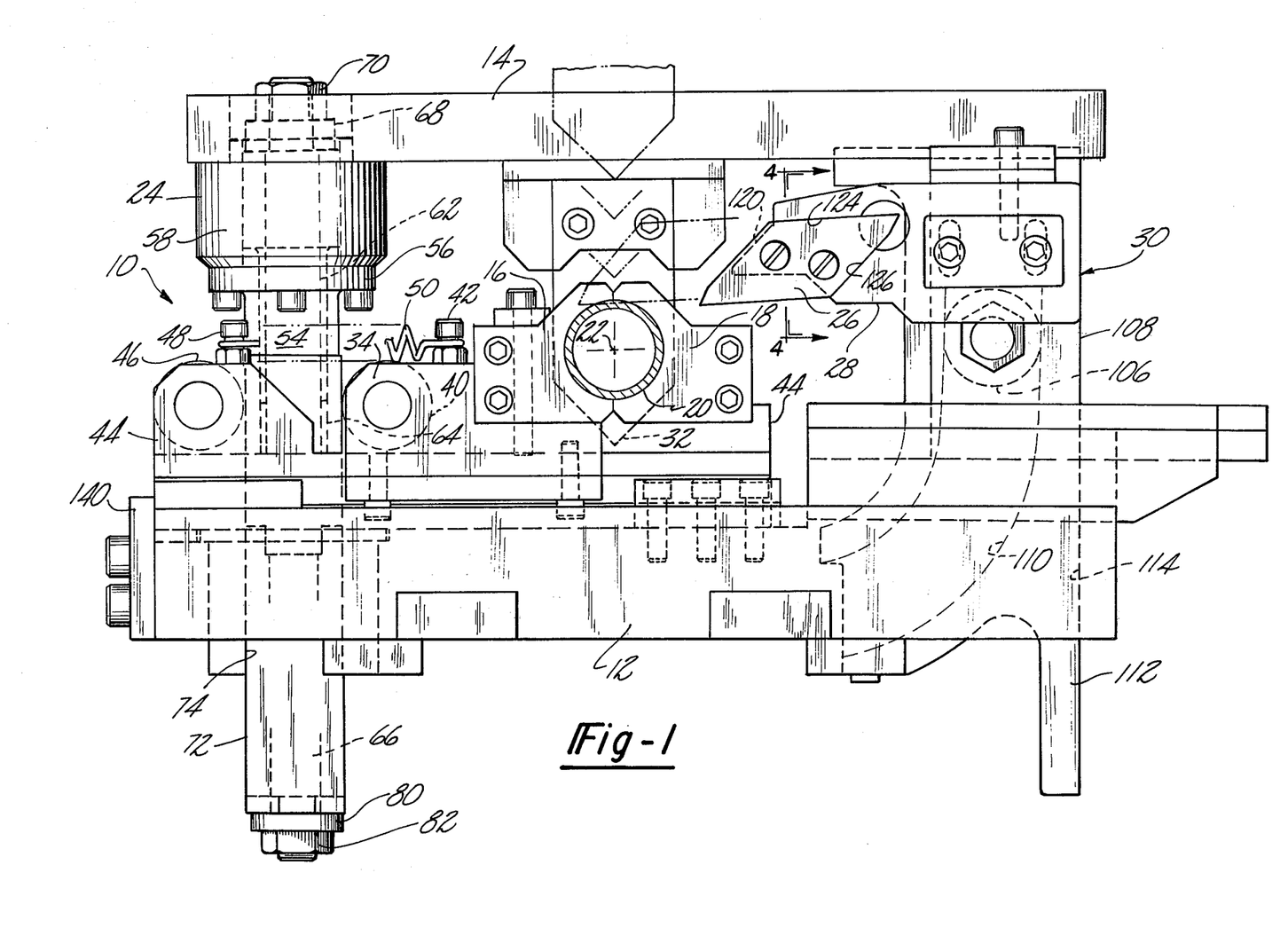
FIG. 1 is a front view of a tube cutoff machine embodying the invention.
Figure 2:
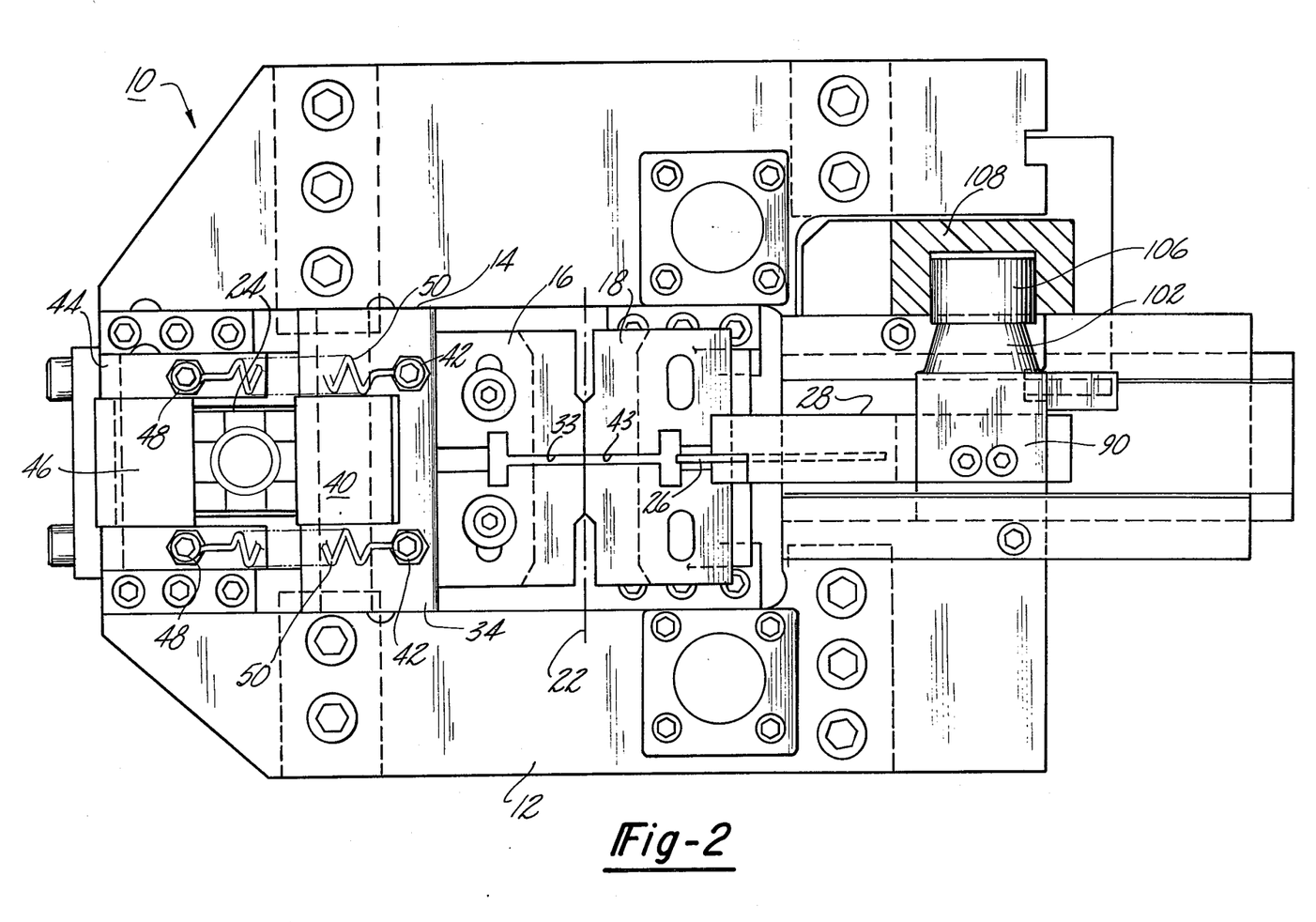
FIG. 2 is a top plan view of the machine of FIG. 1.
Figure 3:
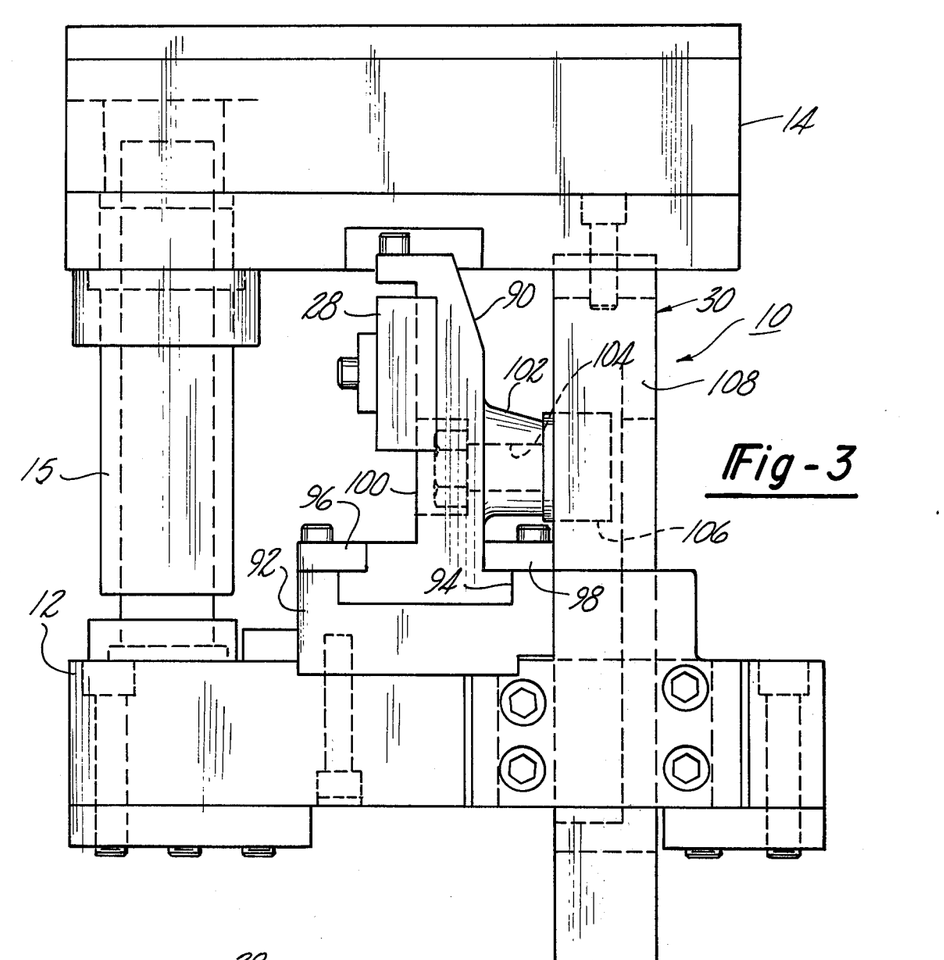
FIG. 3 is an end view of the machine of FIG. 1.

FIGS. 1 – 3

Referring now to FIGS. 1 through 3, there is shown a cutoff machine 10 for selectively severing a tubular steel workpiece 20 and comprising a heavy, rigid and stationary base 12 and a rigid cam assembly 14 which is adapted for reciprocal vertical travel relative to the base 12 on guide pins and busings 15. Ram assembly 14 is driven through a reciprocal vertical path by suitable motive power means, the particular arrangement of drive power not being part of my present invention and, accordingly, not being described in detail. For an example of a ram assembly drive arrangement, reference may be taken to my previously-issued U.S. Pat. No. 3,273,433. Cutoff machine 10 further comprises a pair of complemental die jaws 16 and 18 slidably disposed on the base 12 for clamping and holding the tubular steel workpiece 20, as best shown in FIG. 1. The workpiece 20 typically enters the die jaws 16 and 18 by displacement along axis 22, shown in FIG. 2, and is clamped in place for the performance of the notching and severing operations hereinafter described.

The opening and closing of the die jaws 16 and 18 on the workpiece 20 is synchronized with the reciprocal vertical displacement of the ram assembly 14 by means of a programming cam assembly 24, the details of which are hereinafter described. By way of general description, the programming cam arrangement 24 is such as to establish three operational zones of ram assembly displacement: (1) a neutral zone wherein the die jaws 16 and 18 are opened to permit entry and removal of the workpiece 20; (2) a slotting zone which is vertically above the neutral zone and in which a slotting blade 26 is caused to pass transversely of the workpiece 20 to produce a shallow notch in the tube wall; and (3) a severing zone which is vertically below the neutral zone and in which a sharp, pointed severing blade 32 is caused to pass downwardly through the workpiece, severing it in the manner of a guillotine. As will be hereinafter be made more apparent, the further requirement which is satisfied by the programming cam arrangement is that the neutral zone is operational only during vertically upward travel of the ram assembly 14. It will be appreciated that the terms vertical, upward, downward, and other directional indicators are used in this application in a relative sense and have no absolute significance as the machine 10 may assume various orientations.

Machine 10 further comprises an essentially trapezoidal-shaped notching or slotting blade 26 which is carried by a blade holder 28 for horizontal sliding displacement relative to the base 12 and in a plane perpendicular to the axis 22 and common to the plane of the severing blade 32; i.e., the notching and severing blades pass through precisely the same plane in the workpiece 20. The horizontal and reciprocal motion of the slotting blade 26 and the holder 28 is synchronized with the vertical movement of the ram assembly 14 by means of a second programming cam arrangement 30. This cam arrangement is also described in greater detail with reference to other figures in the drawings.

Describing now the apparatus of FIGS. 1 through 3 in greater detail, the left die jaw 16 is shown to comprise a machined steel die having a transversely extending central slot opening 33 to receive the slotting blade 26 and the severing blade 32 for access to the tubular workpiece 20. The die jaw 16 is removably secured to a left die jaw holder 34 also illustrated in solitary fashion in FIG. 10. Die jaw holder 34 is slidably disposed on the base 12 for movement toward and away from the workpiece axis 22 in laterally extending ways. Jaw holder 34 has spaced parallel wing portions 36 and 38, best shown in FIG. 10, each of which is provided with a bore 39 to receive a cam follower roller assembly 40. Tension spring anchors 42 are shown extending upwardly from the die jaw holder 34 in both FIGS. 1 and 2 for purposes to be described.

Figure 9:
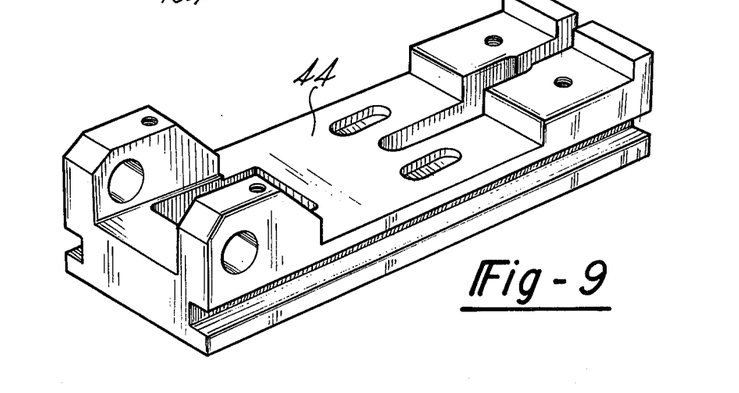
FIG. 9 is a perspective view of one clamping die jaw holder.

Die jaw 18 is reversely similar in configuration to die jaw 16 and, hence, it is provided with the central slot opening 43 which is aligned with slot opening 33 to permit access of slotting and severing blades to the workpiece 20. Die jaw 18 is carried by die jaw holder 44 which is also shown in solitary fashion in FIG. 9. Die jaw holder 44 is also slidably disposed on the base 12 for movement along a line which is perpendicular to the workpiece axis 22. Holder 44, like holder 34, carries a cam follower roller assembly 46 which is parallel to, but spaced from, roller assembly 40 of die jaw holder 34. Spring anchors 48 extend upwardly from die jaw holder 44 and tension springs 50 extend between the anchors 42 and 48 to urge the die jaw holders in such direction as to tend to open the die jaws 16 and 18; i.e., die jaw holder 44 is urged to the right, while die jaw holder 34 is urged to the left, as seen in FIG. 1. The interposition of the cam arrangement 24 between the follower rollers 40 and 46, however, limits the allowable degree of travel according to a program hereinafter described in greater detail. The cam follower assemblies 40 and 46 may be of the type obtainable from McGill Bearings and marketed under the trade name "CAMROL".

Figures 10, 11:
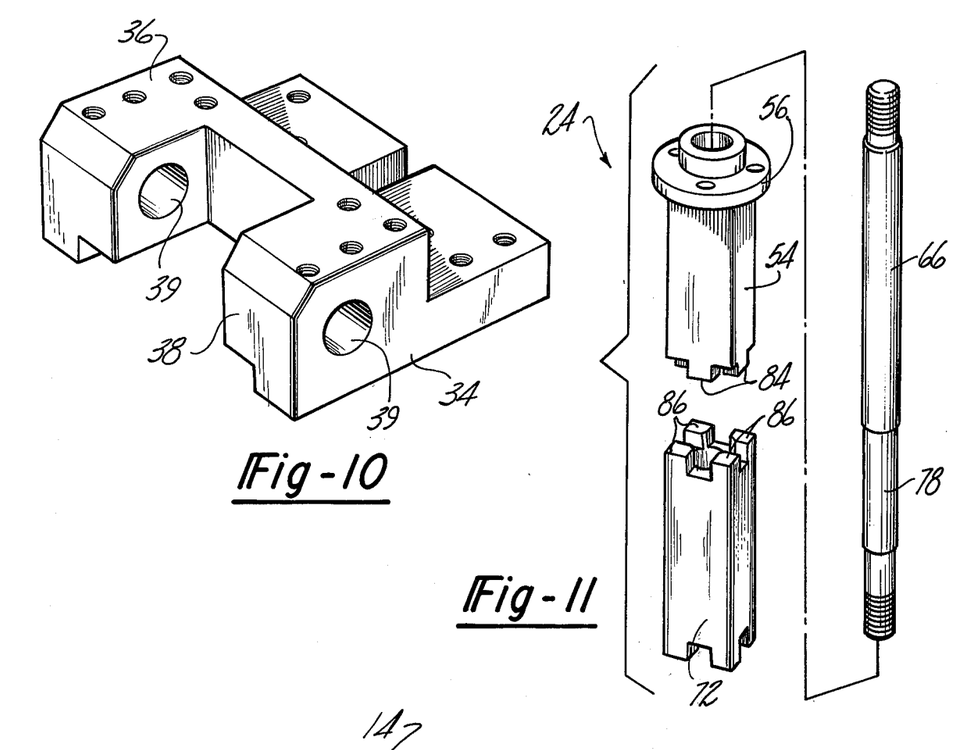
FIG. 10 is a perspective view of another clamping die jaw holder.
FIG. 11 is an exploded view of the improved clamping program control cam arrangement; and, FIG. 12A through 12C is a sequence of views of a schematicized and simplified representation of the cutoff machine in the various operational phases thereof.
Figure 12A:
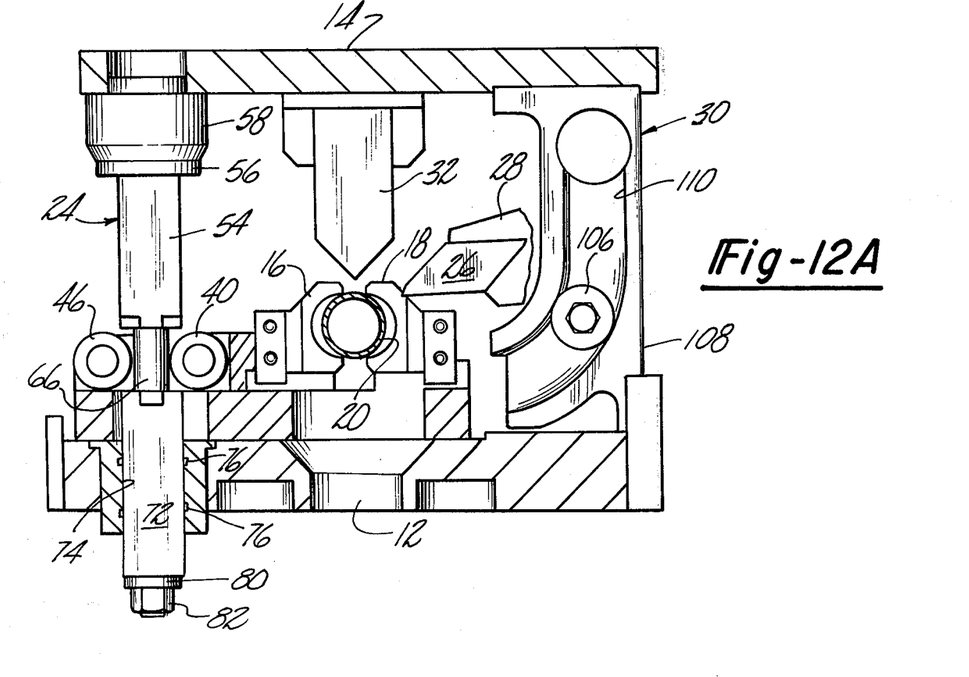
Figure 12B:
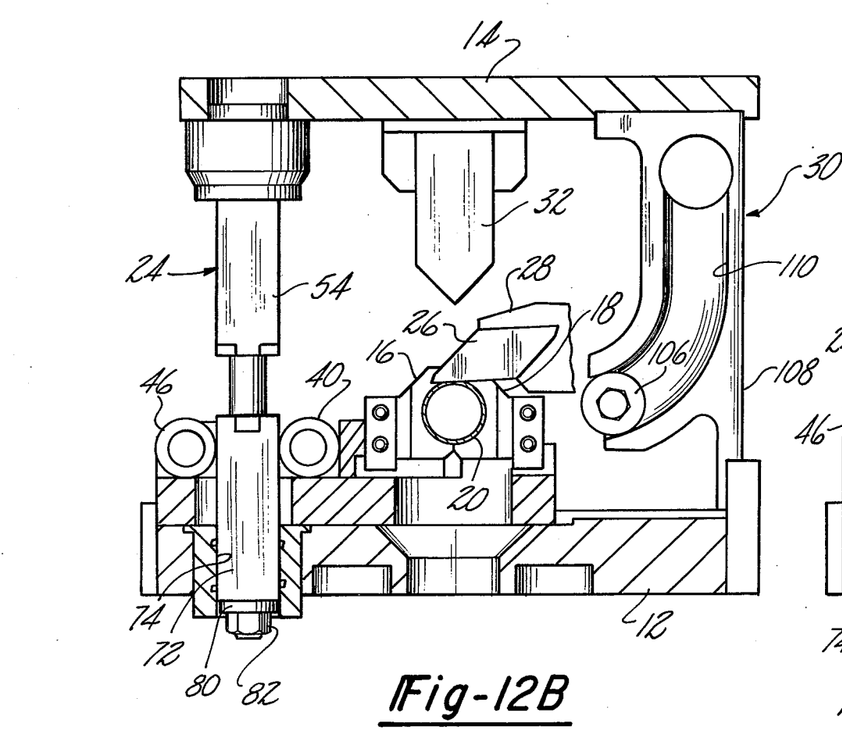
Figure 12C:
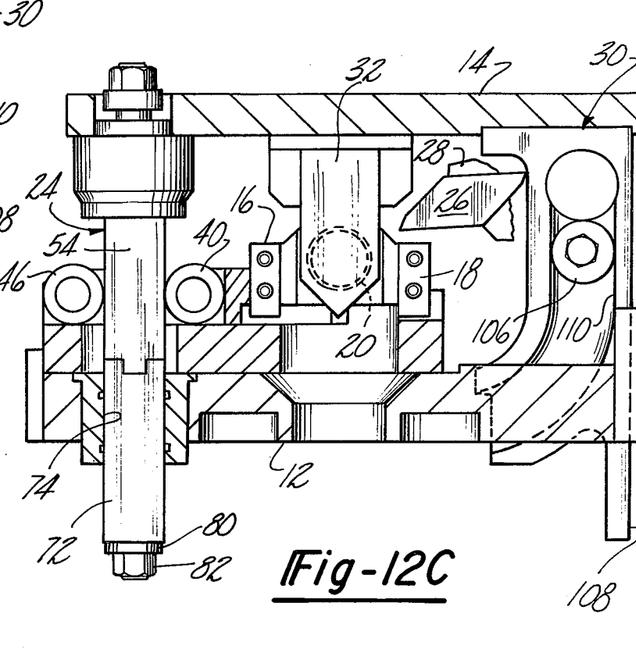

FIGURES 11 & 12 — DIE JAW CAM

Looking now to FIGS. 1, 11, and 12, the details of the cam arrangement 24 which controls the opening and closing of the die jaws 16 and 18 are shown to include a first elongated, hollow cam member 54 having a rectangular or square outer cross-sectional configuration and a cylindrical central bore. The cam member 54 includes a flange portion 56 of increased diameter which facially abuts the end surface of a cam adaptor collar 58 which is press-fit into an aperture 60 in the ram 14. The hollow, cylindrical bore of cam member 54 is fitted with longitudinally spaced bronze bushings 62 and 64 so as to realize a sliding relationship with a centrally located rigid shaft 66. The shaft 66 is provided with a threaded upper end portion to receive a stop washer 68 and a nut 70. Washer 68 bears against the end face of the cam member 54, such that vertically upward travel of the ram 14 and the cam member 54 carries the shaft 66 along. Due to the rigid mechanical securement between cam member 54 and ram 14 in the area of the adaptor collar 58, it is apparent that the cam member 54 moves continuously and reciprocally with the ram assembly 14.

Programming cam assembly 24 further comprises a second elongate hollow cam member 72 which is slidably disposed in an aperture 74 extending continuously through the base and carrying rings 76. Cam member 72 is also of rectangular or square outer cross sectional configuration and is provided with longitudinal cylindrical central bore to receive a stepped-down portion 78 of shaft 66 therein. The bottom end of shaft 76 is provided with a threaded length to receive a stop washer 80 and a lock nut 82. The step in shaft 66 provides an interfering fit with the cam member 72 at the upper end and the stop nut 80 provides an interferring relationship with the cam member at the lower end. Accordingly, the shaft 66 and the cam member 72 are effectively locked together to move vertically in an intermittent pattern.

In other words, the combination of the cam member 54 and 72 and the shaft 66 produces a lost-motion connection between the upper and lower cam members whereby the upper cam member moves reciprocally and continuously while the lower cam member moves reciprocally and intermittently. The lower end of cam member 54 is provided with a notched working surface configuration 84 and the upper end of cam member 72 is provided with a complementally notched working surface configuration 86. Accordingly, the complementally notched configuration 84 and 86 interfit with one anther when the descent of the ram 14 brings the end surfaces of the two cam members together. It can be seen that the disposition of the lower cam member 72 in the aperture 74 places it centrally between the die jaw slide holder 34 and die jaw holder 44. In addition, the left and right flat working surfaces, as shown in FIGS. 1 and 12 of the aligned cam members, are centrally between and in engagement with the cam rollers 40 and 46. The effective transverse thickness or diameter of the cam members is such as to drive the rollers 40 and 46 apart against the force of the bias springs 50 thereby to displace the die jaws 16 and 18 toward one another to clamp the workpiece 20. On the other hand, the vertical displacement of the cam assembly 24 to a condition where the bare shaft 66 is between the rollers 40 and 46, permits the rollers to move toward one another under the action of the springs 50 to open the jaws to the extent of the difference in thickness between the cam members and the shaft 66. As hereinafter described in greater detail with particular reference to FIG. 12, the disposition of the bare shaft 66 between the cam follower rollers 40 and 46 occurs once during each complete cycle of ram displacement; i.e., during the traversal of the neutral zone in the upbound direction of ram displacement. Cam members 54 and 72 are square in section and each can be rotated at 90° at periodic intervals and remounted to provide new unworn cam surfaces to the jaw clamp assembly. Thus, long life is provided.

Figures 5, 6, 7, 8:
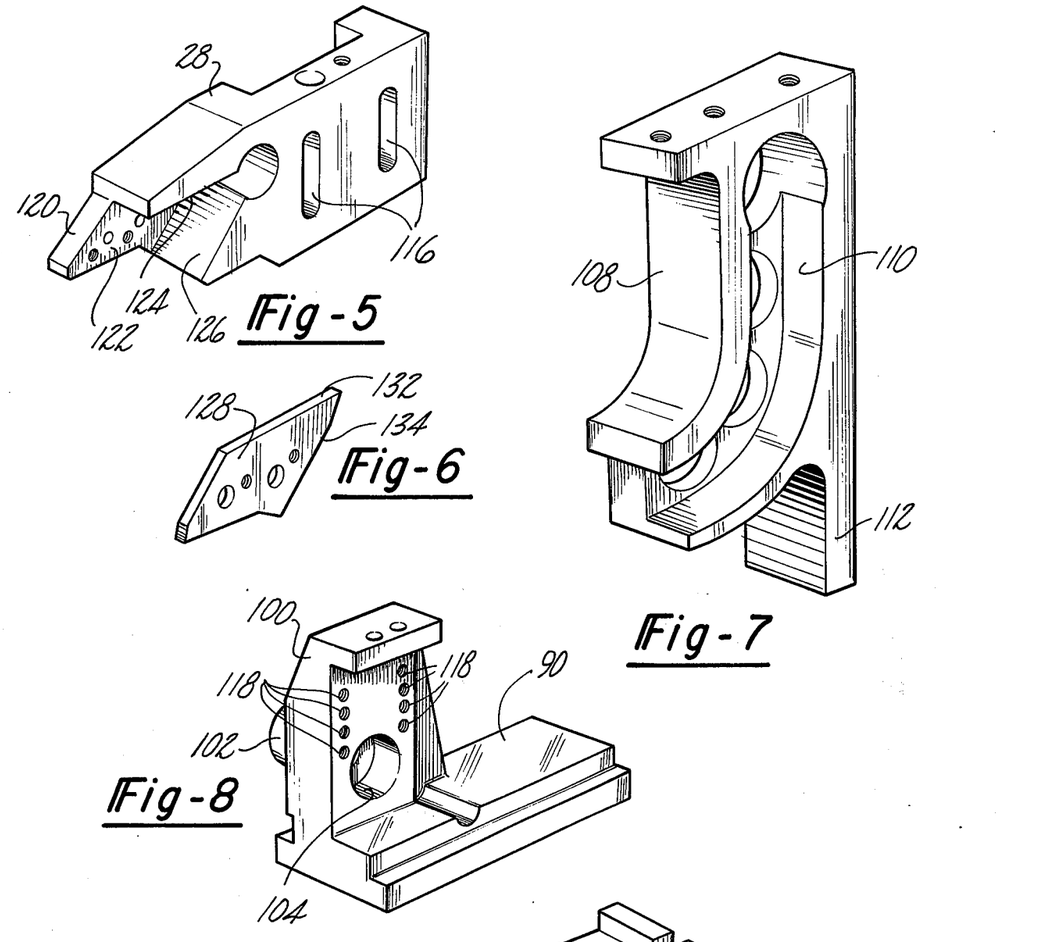
FIG. 5 is a perspective view of the slotting blade holder.
FIG. 6 is a perspective view of a typical slotting blade spacer.
FIG. 7 is a perspective view of a slotting slide control cam.
FIG. 8 is a perspective view of the slotting blade slide.

FIGS. 3, 7, & 8 — SLOTTED CAM

Looking now to FIGS. 1 through 3, 7, and 8, the details of the cam arrangement 30 which programs the horizontal sliding displacement of the notching or slotting blade 26 will be described. In the drawings, the slotting blade 26 is shown supported by a cross slide 90 which is slidably disposed in a cross slide base 92 which is in turn secured to the cutoff machine base 12 by means of machine screws. Cross slide base 94 is machined out to define a transversely oriented slide way 94 which receives the elongated base of the cross slide 90. Slide 90 is secured in the way 94 by means of gibs 96 and 98 which are bolted to the cross slide base 92.

Cross slide 90 includes an upstanding portion 100 which is integral with the slide base and which includes a laterally projecting annulus 102 having a cylindrical through bore 104. The bore is such as to receive a cam follower roller 106 and the securement means therefor.

A vertically depending track cam 108 is rigidly secured to the ram assembly 14 in a position to be operatively engaged with the cam roller 106 of the slotting blade cross slide 90. Cam 108, as best shown in FIG. 7, is machined out to define an inner track 110 having opposite parallel working surfaces, the initial portion of which measured from the ram assembly 14 is substantially, if not exactly, vertical and the lower portion of which measured from the cam assembly 14 is arcuate, the curve tending to take the track toward the workpiece axis 22 with increasing distance from the ram assembly 14 when the cam is installed on the ram 14. Cam 108 also includes a full length, vertical extension 112 which slidingly bears against the interior surface 114 of a vertically extending aperture in the base 12 to maintain the vertical alignment of the cam and to provide a force reaction surface during the working stroke of the slotting blade as hereinafter described.

The operative engagement between the cam follower roller 106 of the slotting blade cross slide 90 and the internal track 110 of cam 108 is such that the roller 106 is disposed in the track at all times so as to follow the horizontal component of track displacement which is associated with the vertical displacement of the ram assembly 14. It is apparent in FIG. 1 that the full descent of ram assembly 14 toward base 12 brings the roller 106 into the vertical portion of the internal track 110 and causes the slotting blade 26 and the associated holder 28 to be displaced to the right, as seen in FIG. 1; i.e., away from the workpiece axis 22. On the other hand, the full ascent of the ram assembly 14 is such as to bring the arcuate portion of the cam track 110 into operative engagement with the roller 106, thus, to drive the slotting blade 26 and the slotting blade holder to the left, as seen in FIG. 1; i.e., toward and across the workpiece axis 22. The vertical portion of the cam track 110 is associated with the neutral and severing zones of ram assembly displacement and the arcuate portion of the track 110 is associated with the slotting zone of ram assembly displacement. It can be seen that the opposite working surfaces of cam track 110 provide a positive mechanical drive for the cross slide 90 in both left and right transverse directions, as seen in FIG. 1.

FIGS. 1, 4, 5, 6, & 8 — SLOTTING BLADE DETAILS

Looking now to FIGS. 1, 4, 5, 6, and 8, the details of the slotting blade and holder assembly and the association thereof with the cross slide 90 will be described in greater detail.

Slotting blade holder 28, as best shown in FIG. 5, comprises a body of rigid material having a pair of parallel, elongated slots 116 which receive fastener bolts to secure the slotting blade holder to the upstanding portion 100 of the cross slide 90. A set of vertically spaced bolt holes 118 in holder 90 coact with the elongated slots 116 to provide for a series of vertical position adjustments of the blade holder relative to the cross slide and, accordingly, relative to the workpiece axis 22. Thus, different blade depth and different workpiece sizes may be readily accommodated.

Slotting blade holder 28 further comprises an extension portion 120 having a flat recessed blade-receiving face 122 bordered by blade seat surfaces 124 and 126, the two surfaces intersecting at an acute angle which is the same as the angle included between intersecting edges of the substantially trapezoidal blade 26, as best shown in FIG. 1. Facial surface 122 and seat edges 124 and 126, thus, receive and accommodate the slotting blade 26 in a working position best illustrated in FIGS. 1 and 2. This position being slightly "nose down" so as to locate the point of the blade 26 at precisely the depth to which the workpiece wall is to be slotted.

Figure 4:
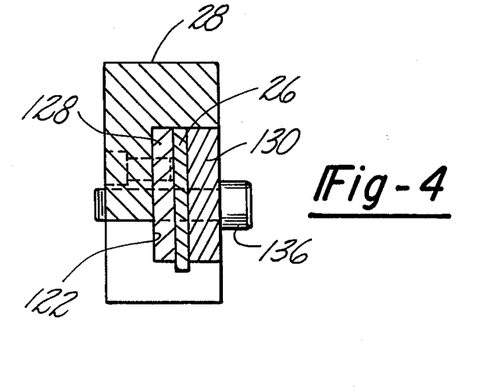
FIG. 4 is a cross-sectional view of the blade holder and associated apparatus for the slotting blade.

It is also essential to precisely locate the slotting blade 26 in the vertical plane of the severing blade 32 and also within the plane defined by the slot openings 33 and 43 in the die jaws 16 and 18. To accomplish this, the recessed surface 122 of the slotting blade holder 28 is offset from the severing blade plane to receive a blade space 128 (FIG. 6) having peripheral edges 132 and 134 which abut the seat edges 124 and 126, respectively. Accordingly, the spacer 128 lies between the facial surface 122 of the holder 28 and the slotting blade 26, as best shown in FIG. 4. A blade clamp 130 of a configuration similar to that of the spacer 128 and the slotting blade 26 is placed over the blade 26 and the entire sandwiched assembly is secured together by means of machine screws 136.

The preferred implementation of the invention involves furnishing a plurality of spacers all having the configuration of spacer 128 but having varying thicknesses to be associated with slotting blades of varying thickness; the thinner spacer is correlated with a thicker slotting blade and vice versa. By this provision, blades of varying thickness and strength may be substituted for one another to slot workpieces of varying density, hardness, and size while at all times maintaining the slotting blade 26 precisely in the plane of the severing blade 32. A similar arrangement is preferably provided for the severing blade 32.

As best illustrated in FIG. 1, a still further feature of the illustrative embodiment is the provision of a thrust plate 140 secured to the left side of the base 12 and projecting slightly above the surface of the base so as to engage the left edge of the die jaw holder 44 when the jaw 18 is in the closed position. Thrust plate 140, thus, braces the cam assembly 24 and associated components by reacting against the force generated during the working stroke of the slotting blade 26 and transmitted to the thrust plate 140 by workpiece 20, die jaw 16, holder 34, cam follower roller 40, cam member 72, cam follower roller 46, and holder 44. It has been found that the thrust plate 140 greatly strengthens and rigidifies the assembly and prevents loosening and wear of various components over a period of time.

OPERATION

For the purpose of describing the operation of the machine 10, FIGS. 12A, 12B, and 12C have been prepared in a simplified and schematicized fashion to represent the respective positions of the machine components at the four principal operational positions as follows: FIG. 12A represents the position of the machine components at the start and stop positions (neutral zone of ram displacement), FIG. 12B represents the position of the components during the slotting stroke, and FIG. 12C represents the position of the machine element at the bottom of the severing stroke.

In FIG. 12A, it can be seen that the ram assembly 14 occupies an intermediate vertical position relative to base 12 and that both the severing and slotting blades 32 and 26, respectively, are out of engagement with the workpiece 20. Cam rollers 40 and 46 are separated only by the relative small diameter shaft 66, the cam members 54 and 72 being axially separated from one another. Accordingly, the springs 52 pull the rollers 40 and 46 of the die jaw holders together and open the die jaws 16 and 18 to permit the workpiece 20 to be inserted and removed by longitudinal displacement along the axis 22. The cam follower roller 106 of the slotting blade cross slide 90 is just entering the arcuate portion of the cam track in cam 108 and, hence, the slotting blade 26 is not yet in engagement with the workpiece 20. Assuming FIG. 12A is taken to represent the start position, the subsequent displacement of ram assembly 14 is vertically upward.

It can be seen that the upward displacement of the ram assembly from the position represented by FIG. 12A to the position represented by FIG. 12B carries the severing blade 32 still farther away from the workpiece 20. Such displacement, however, causes the washer 80 on shaft 66 to lift the lower cam member 72 of cam assembly 24 until the cam member 72 is in engagement with and fully between cam follower rollers 40 and 46. Cam follower rollers 40 and 46 are, thus, displaced apart against the bias of the springs 52 to close the die jaws 16 and 18 on the workpiece 20. The workpiece 20 is, thus, securely clamped in place.

Ascent of the ram assembly 14 further causes the cam follower roller 106 to be displaced fully into the arcuate portion of the curving cam track to produce the horizontal displacement of the slotting blade cross slide to the left; i.e., from the position represented in FIG. 12A to the position represented in FIG. 12B. Slotting blade 26, thus, displaces transversely through and along the slot opening defined in the die jaws and produces a shallow, transverse slot in the upper wall of the workpiece 20. The force produced by the action of the slotting blade 26 on the workpiece 20 during the slotting operation is transmitted through the cam assembly 24 to the thrust plate 140, as previously described.

Continuous rotation of a crankshaft assembly which may be used to drive the ram assembly 14 through the reciprocal cycle of displacement reverses the direction of the ram assembly displacement and drives it downwardly from the uppermost position represented in FIG. 12B to the lowermost position or bottom of the stroke represented in FIG. 12C. Downward displacement of ram assembly 14 produces downward displacement of cam member 54 while the lower cam member 72 remains in the position of FIG. 12B until the notched coacting surfaces 84 and 86 abut one another. At this point, the two cam members 54 and 72 are essentially joined together to provide a continuous external set of cam surfaces to the cam follower rollers 40 and 45. Accordingly, as the ram assembly 14 continues on to the position of FIG. 12C, a continuous cam surface is presented to the rollers 40 and 46 holding them apart and, thus, holding the die jaws 16 and 18 in the closed position even though the ram assembly 14 passes through what was previously the neutral zone. Downward displacement of ram assembly 14 carries the cam follower roller 106 of the slotting blade cross slide 90 into the vertical portion of the cam track 110, thus, retracting or withdrawing the slotting blade 26 from the workpiece 20. The severing blade 52 descends in the fashion of a guillotine precisely in the plane of the now-formed slot in the workpiece 20 to sever the workpiece into two sections, each having well-formed ends which in the typical case require no subsequent treatment since tube end deformation is minimized, if not eliminated by the operation of the present invention.

Following the attainment of the bottom stroke position shown in FIG. 12C, the ram assembly 14 again reverses direction and moves back to the top position represented by FIG. 12A. In the course of reaching this position, the ascent of the ram assembly 14 lifts only the upper cam member 54, the shaft 66 tending to slide within the bronze bushings 62 and 64, and otherwise remaining in position with the lower cam member 72. As the cam members 54 and 72 separate axially, the shaft 66 between the cam rollers 40 and 46 is again open to permit the rollers to move toward one another to open the die jaws 16 and 18. The severing blade 52 is lifted out of the severing area and the vertical portion of cam track 110 allows the slotting blade 26 to remain in the position represented by FIG. 12A. Accordingly, the newly severed workpiece sections may be withdrawn, the uncut portion of the workpiece advanced to the next severing position, and the cycle repeated as many times as desired. It is apparent that this process may be repeated continuously for tubing which emerges from a tube mill on a continuous basis.

It is to be understood that the invention has been described with reference to an illustrative embodiment and, accordingly, the foregoing description is not to be construed in a limiting sense.

I claim:

1. Apparatus for severing a tubular workpiece comprising: a base for receiving the workpiece; a ram assembly reciprocable vertically and cyclically displaceable relative to the base; a severing blade carried by said ram assembly; workpiece clamping means on said base; actuator means operatively connected between said base and ram assembly for causing said clamping means to clamp the workpiece during a cycle of ram assembly displacement; slide means on said base carrying a slotting blade and having a work stroke in the plane of the severing blade and transversely of the workpiece for slotting an upper wall of the workpiece; cam follower means on said slide means; and, a vertically depending cam carried by said ram and engaging said follower means and being so configured to advance said slide means toward said workpiece only during vertical displacement of the ram assembly away from the workpiece, said workpiece clamping means comprising a pair of complemental die jaws, first and second slide means carrying respective jaws for sliding displacement relative to the base, and first and second cam follower means on respective slide means; the actuator means comprising a two-part lost motion cam assembly operatively interconnected between the ram and base and engageable with the first and second cam follower means to close the jaws on the workpiece, and stop means on the base and engaging one of the slide means when the die jaws are closed to react against force produced by the work stroke of the slotting blade and transmitted to the one slide means via the die jaw, the other slide means, the cam follower means, and cam assembly.

2. Apparatus as defined in claim 1 wherein said ram assembly displacement includes a neutral zone, a slotting zone vertically above the neutral zone, and a severing zone vertically below the neutral zone, the cam being configured to advance the slide means toward the workpiece only as the ram assembly traverses the slotting zone.

3. Apparatus as defined in claim 2 wherein the cam comprises a rigid member secured to the ram, a vertical portion adjacent the ram, said vertical portion terminating in an arcuate portion which curves inwardly toward the workpiece with increasing distance from the ram.

4. Apparatus as defined in claim 3 wherein the rigid member defines a track having parallel opposite actuating surfaces, the slide means comprising a rigid slide member horizontally slidable on the base, the cam follower comprising a roller disposed in the track and engageable with said surfaces to roll thereover during vertical travel of the ram.

5. Apparatus as defined in claim 1 wherein the stop means comprises a rigid plate mechanically secured to the base and interferingly engaging the one die jaw slide means.

6. Apparatus as defined in claim 1 wherein the clamping means comprises a pair of complemental die jaws each having a transversely extending slot opening in the plane of the severing blade, the slotting blade slide means comprising a blade holder having a seat portion offset from said plane, a slotting blade in the seat portion and held thereby, and a spacer disposed in said seat portion and between the holder and the blade and of such thickness as to locate the slotting blade in the plane of the slot opening.

7. In a cutoff machine for severing tubular workpieces wherein the machine comprises a base, a ram assembly reciprocally movable relative to the base, a slotting blade movable transversely across the workpiece, a severing blade carried by the ram in the plane of the slotting blade, and first and second clamping jaws for clamping the workpiece during slotting and severing operations, the improvement comprising a control cam assembly for synchronizing the opening and closing of the jaws with the movements of the ram assembly and including: a first elongated cam member carried by the ram assembly for continuous movement therewith, a second elongated cam member carried by the base for intermittent movement relative thereto, a rigid shaft of lesser cross sectional dimension than the cam members extending in common alignment through the first and second cam members and being slidable relative to the first cam member to produce a unidirectional lost-motion connection between the cam members, the clamping jaws having follower means on respective opposite surfaces of the control cam assembly to close the jaws when engaging the cam members and to open the jaws when engaging the shaft between the cam members.

8. Apparatus as defined in claim 7 wherein the cam members are of rectangular cross-sectional configuration to define flat working surfaces for engagement with the follower means.

9. Apparatus for severing a tubular workpiece comprising: a base for receiving the workpiece; a ram assembly reciprocable vertically and cyclically displaceable relative to the base, wherein said ram assembly displacement includes a neutral zone, a slotting zone vertically above the neutral zone, and a severing zone vertically below the neutral zone; a severing blade carried by said ram assembly; workpiece clamping means on said base, wherein said clamping means comprises first and second complemental die jaws slidable on the base, and bias means for opening the jaws to receive and release a workpiece, actuator means operatively connected between said base and ram assembly for causing said clamping means to clamp the workpiece during a cycle of the ram assembly displacement, said actuator means comprising a first elongated cam carried by and vertically depending from the ram for continuous reciprocal movement therewith, a second elongated cam slidably carried by the base in vertical alignment with the first cam, and a shaft commonly operatively connected through the first and second cams to produce a lost motion connection between said cams, and cam follower means carried by respective die jaws and engageable with opposite vertical surfaces of the first and second cams during displacement thereof with the ram to close the die jaws, the upward extremity of travel of the second cam and the lower extremity of travel of the first cam being in operative engagement with the cam follower means for the die jaws to open the jaws only during upward displacement of the ram through the neutral zone; slide means on said base carrying a slotting blade and having a work stroke in the plane of the severing blade and transversely of the workpiece for slotting an upper wall of the workpiece; cam follower means on said slide means; and a vertically depending cam carried by said ram and engaging said follower means to advance said slide means toward said workpiece, the cam being configured to advance the slide means toward the workpiece only as the ram assembly traverses the slotting zone.

\* \* \* \* \*